Sept. 18, 1951     E. L. LAUNDER     2,568,074
TORCH HANDLING APPARATUS
Filed April 10, 1948     4 Sheets-Sheet 1
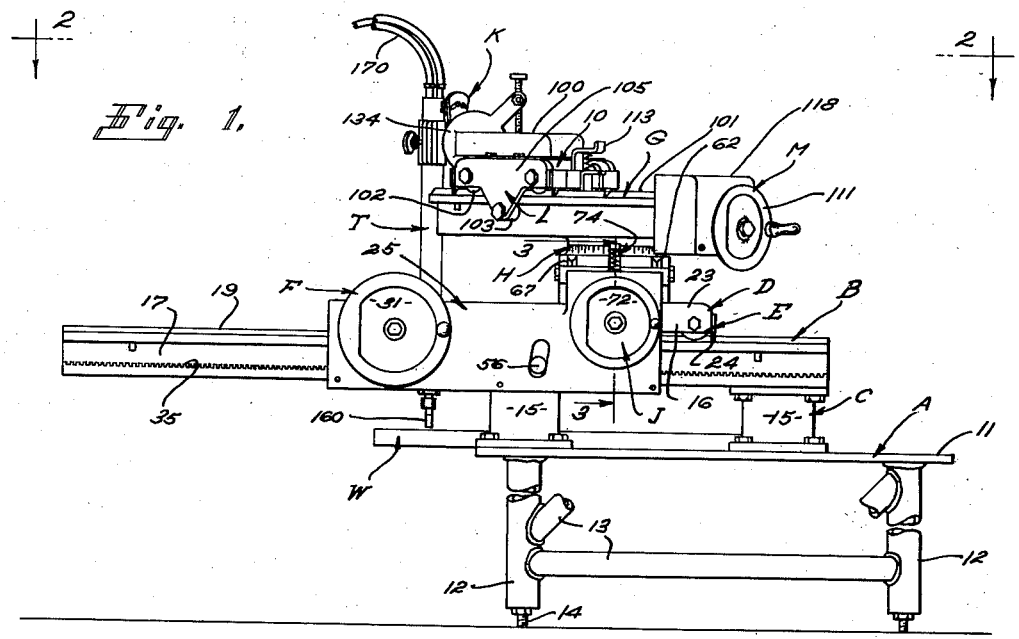
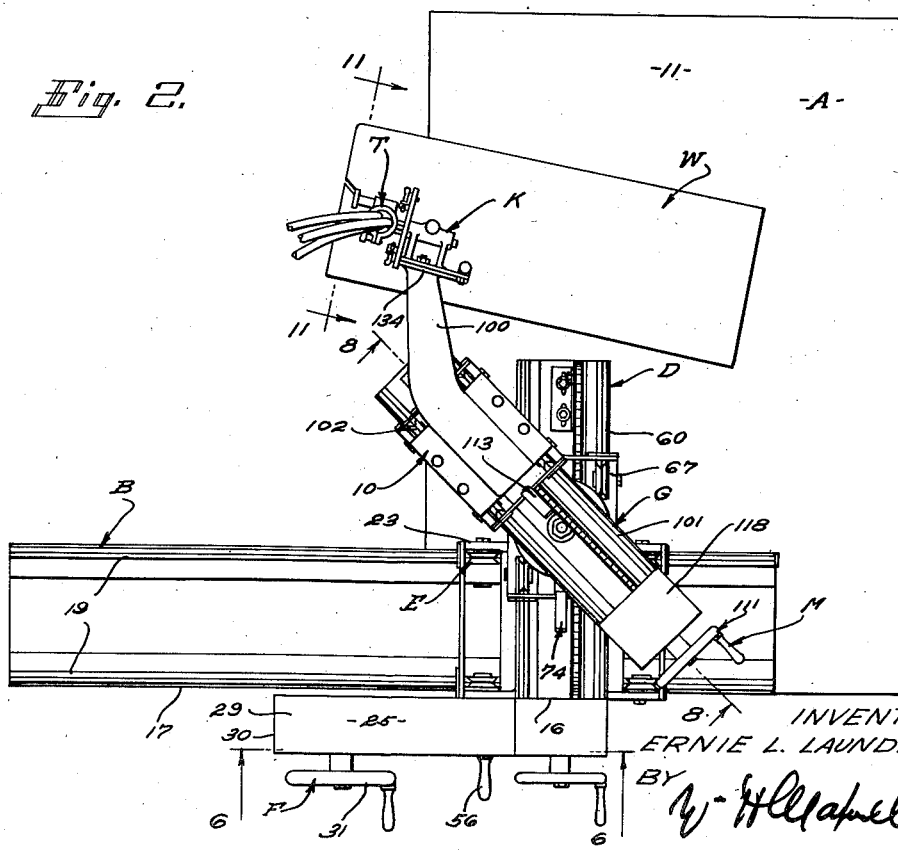
INVENTOR
ERNIE L. LAUNDER
BY
ATTORNEY Sept. 18, 1951  E. L. LAUNDER  2,568,074
TORCH HANDLING APPARATUS
Filed April 10, 1948  4 Sheets-Sheet 2
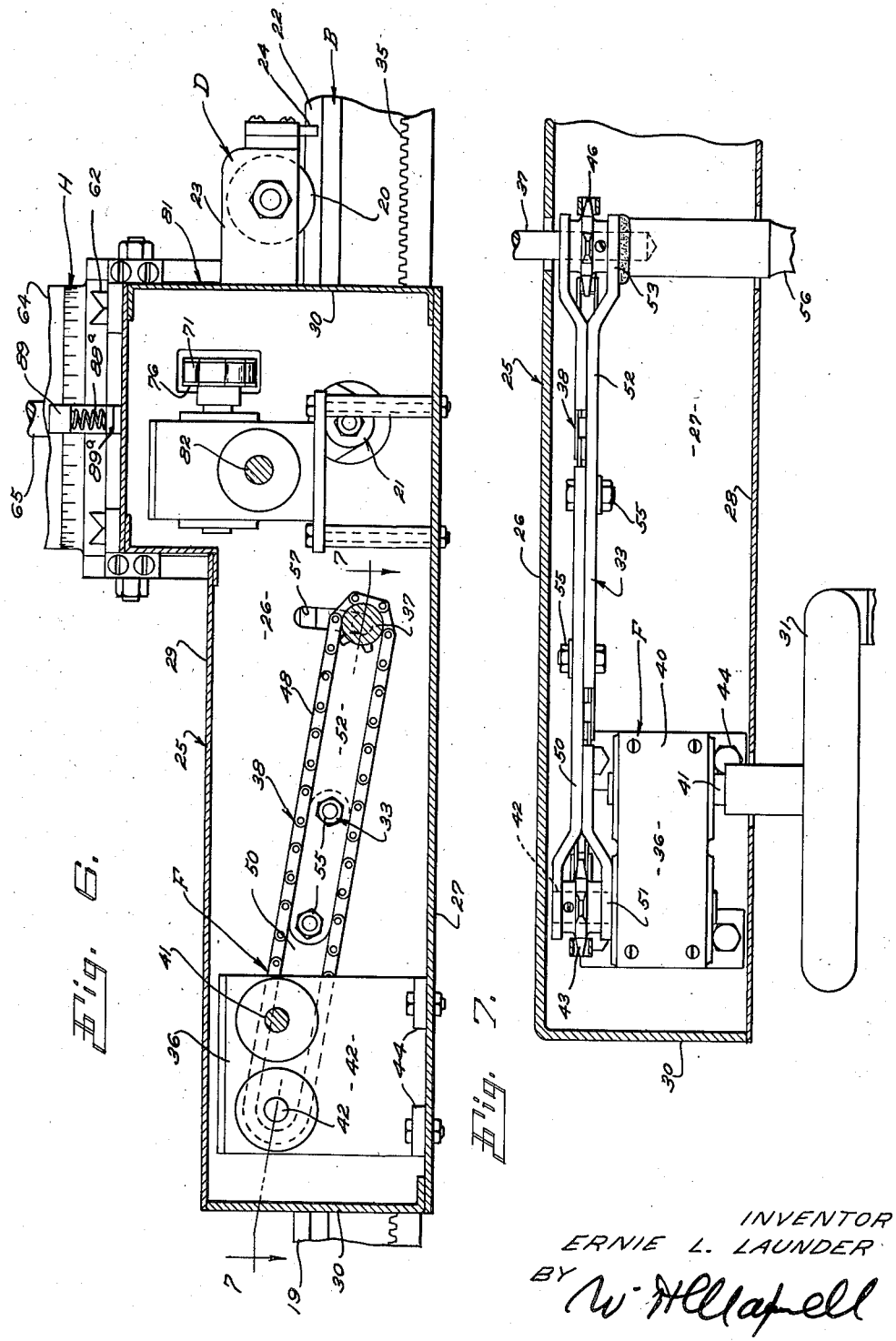
INVENTOR
ERNIE L. LAUNDER
BY
ATTORNEY

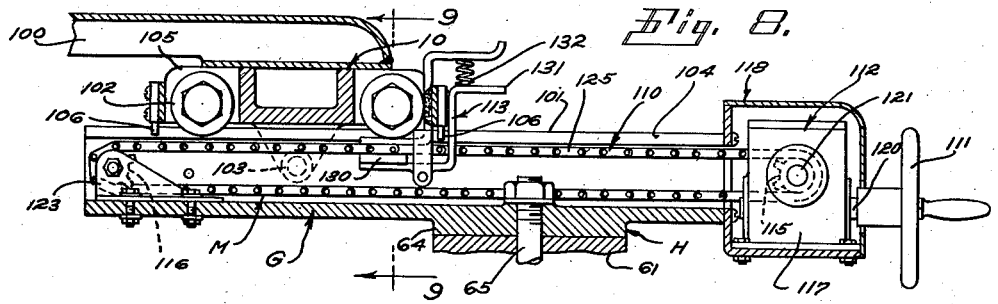
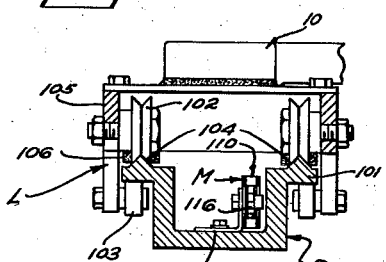
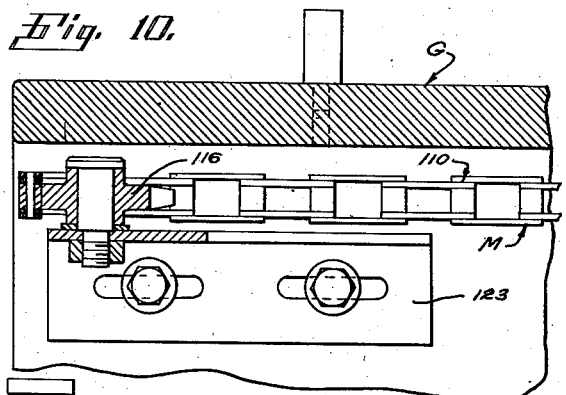
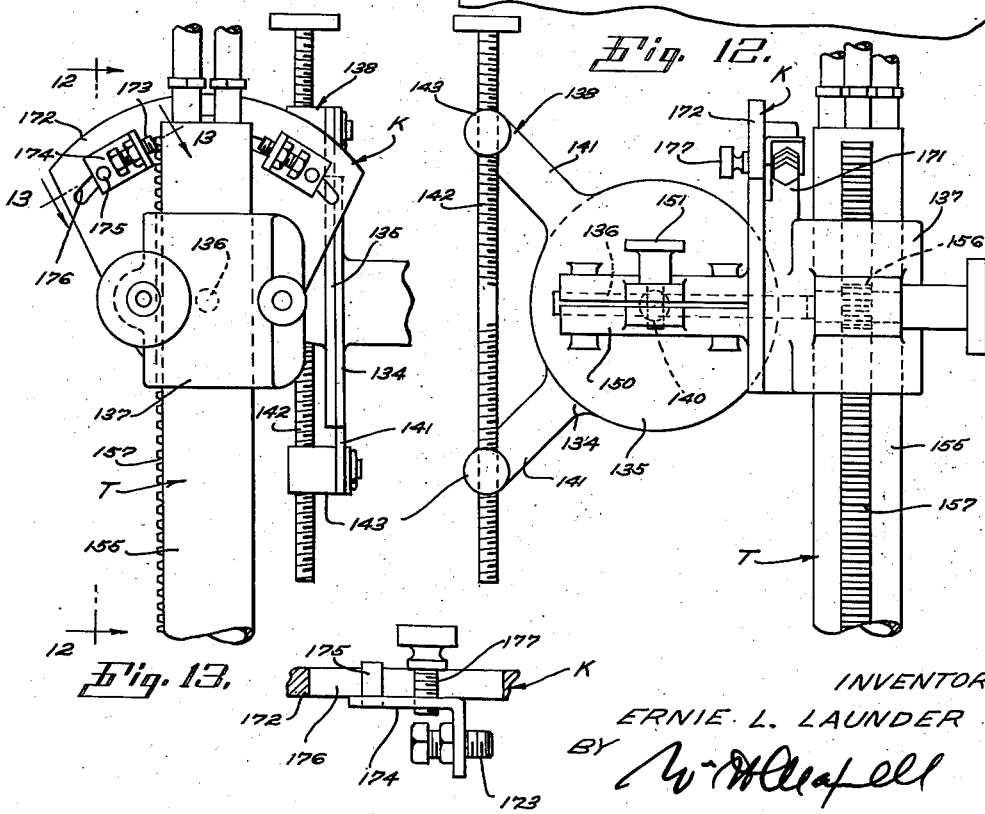

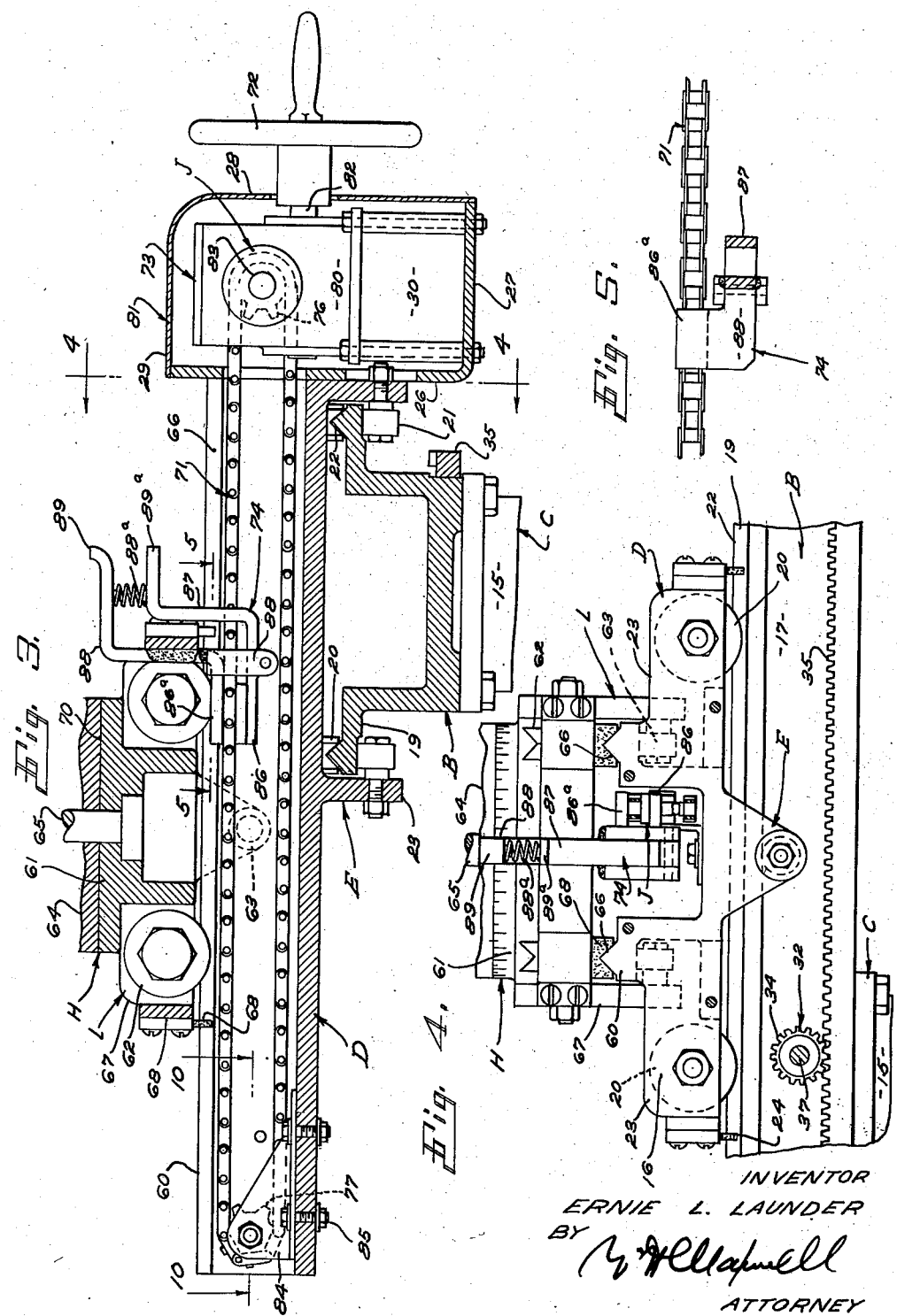

Patented Sept. 18, 1951

2,568,074

UNITED STATES PATENT OFFICE 2,568,074

TORCH HANDLING APPARATUS

Ernie L. Launder, Montebello, Calif.

Application April 10, 1948, Serial No. 20,182

7 Claims. (Cl. 266—23)

This invention has to do with a torch handling apparatus and it is a general object of the invention to provide a simple, accurate and easily operated mechanism by which a cutting torch is coordinated with a unit of work to the end that the work is cut by the flame of the torch in the manner or at the points desired.

There are various conditions under which work, say for instance a sheet of steel, or the like, is operated upon by a cutting torch in order to remove parts or to be shaped. With equipment heretofore available torches employed for cutting steel, or the like, have been guided in various ways relative to the work, but as far as I am aware no apparatus has been provided which handles a torch relative to work so that the torch can be moved in any desired manner relative to the work while being maintained in position to cut the work in the manner or at the angle desired.

A general object of the present invention is to provide a torch handling apparatus embodying a work table which supports the unit of work being operated upon and a plurality of relatively movable elements, one of which supports the torch, this element being under full control of the operator so that the torch can be moved in any desired manner relative to the work.

A general object of the present invention is to provide various simple yet accurate mechanisms in apparatus of the character referred to whereby parts may be fed slowly and accurately or may be rapidly shifted, as operating conditions require.

Another object of the present invention is to provide apparatus of the general character referred to including a torch holder or torch carrying head of simple practical design and construction serving to hold a torch relative to work so that it is readily shiftable between different positions in order that the angle of the cut may be varied as desired.

The various objects and features of my invention will be fully understood from the following detailed description of a typical preferred form and application of the invention, throughout which description reference is made to the accompanying drawings, in which:

Fig. 1 is a front elevation of the apparatus embodying the present invention, showing a cutting torch held thereby and in operating position relative to a unit of work held by the apparatus. Fig. 2 is a plan view of the structure shown in Fig. 1, being a view taken as indicated by line 2—2 on Fig. 1. Fig. 3 is an enlarged detail sectional view taken as indicated by line 3—3 on Fig. 1. Fig. 4 is a transverse sectional view of the structure shown in Fig. 3, taken as indicated by line 4—4 on Fig. 3. Fig. 5 is a plan section of a portion of the apparatus shown in Fig. 3, being a view taken as indicated by line 5—5 on Fig. 3. Fig. 6 is an enlarged detailed transverse sectional view of a portion of the mechanism, being a view taken as indicated by line 6—6 on Fig. 2. Fig. 7 is an enlarged plan section of a portion of the structure shown in Fig. 6, being a sectional view taken as indicated by line 7—7 on Fig. 6. Fig. 8 is an enlarged vertical sectional view of a portion of the mechanism shown in Fig. 2, being a view taken as indicated by line 8—8 on Fig. 2. Fig. 9 is a transverse sectional view taken as indicated by line 9—9 on Fig. 8. Fig. 10 is an enlarged plan view of a portion of the structure shown in Fig. 3, being a view taken as indicated by line 10—10 on Fig. 3. Fig. 11 is an enlarged detailed view taken as indicated by line 11—11 on Fig. 2. Fig. 12 is an enlarged view of the structure shown in Fig. 11 being a view taken in the direction indicated by line 12—12 on Fig. 11, and Fig. 13 is an enlarged detailed sectional view taken as indicated by line 13—13 on Fig. 11.

The apparatus embodying the present invention includes, generally, a work table A suitable for supporting a unit of work W, a base B which is an elongate horizontally disposed element, a support C for the base supporting it in a fixed predetermined position relative to the table, a main or lower carriage D operable lengthwise of the base, a mounting E supporting the main carriage on or from the base, a drive F for operating the main carriage relative to the base, an upper or second carriage G operable lengthwise of the main carriage, a mounting H supporting the upper carriage on or from the main carriage for movement therealong and for rotation about a pivotal axis, a drive J for operating the mounting H of the upper carriage along the lower or main carriage, a torch mounting K serving to support a torch T on the upper carriage through a carrier 10, a mounting L supporting the carrier on the upper carriage for movement therealong, and a drive M for the carrier 10 of the torch mounting K operating it lengthwise of the upper carriage G.

The work table A may, in practice, vary widely in form, size and shape, depending upon the character of work W to be handled or possibly upon the operations to be performed upon the work. In the case illustrated the table is shown as involving a flat horizontally disposed top 11 supported by a plurality of legs 12. The legs 12 are shown secured to the top 11 to depend therefrom and are provided with suitable ties or braces 13. In the particular case illustrated each leg 12 is provided with adjusting means whereby the structure can be adjusted to accurately locate or position the table. The adjusting means shown involves an adjustable tip 14 on the lower end of each leg.

The base B related to the table A is an elongate horizontally disposed structure preferably supported by or through the support C so that it is at one end, say for example the forward end, of the table top 11 and extends parallel with the forward end of the table top. In practice the base B may be varied widely in form and construction and it is made of such length as to allow for the desired movement of the main carriage.

The support C holds the base B stationary and it is preferred that it be such as to support the base B from the table A. In the case illustrated the support C is shown including a plurality of pedestals 15 which are vertically disposed and which have their lower ends joined or fixed to the top 11 of the table A while the upper ends are joined or fixed to the bottom of the base B.

The lower or main carriage D is an elongate horizontally disposed element joined to or mounted on the base B through the mounting E to be movable or shiftable lengthwise of the base. In the preferred arrangement the main carriage D is coupled to the base B by the mounting E so as to extend transversely of the base and so that its forward end 16 is flush with or substantially coincidental with the front or forward side 17 of the base B. The main carriage D is of such length or extent as to project a substantial distance rearward of the base B so that it overlies or overhangs the table A or work W on the table A when the apparatus is positioned as shown in the drawings.

The mounting E in accordance with the preferred form of the present invention supports the main carriage D so that it is immediately above the base B and is related to the base B in the manner above described. The mounting E involves, generally, rails 19 mounted on or carried by the base B, supporting wheels 20 carried by the carriage D and operable along the rails 19, and retaining wheels 21 carried by the carriage and engaged with the rails to retain the carriage on the base.

The rails 19 extend longitudinally of the base and in the construction illustrated they are in the nature of horizontally projecting side flanges on the upper portion of the base and each has at its top side an upwardly projecting ridge with inclined or angularly related sides 22.

The supporting wheels 20 are connected with the carriage D through suitable brackets 23 and it is preferred to form them with grooved peripheries receiving the ribs of the rails so that the carriage is guided by the rails for movement only longitudinally thereof. In preferred arrangement there is a bracket 23 at each side of the mounting E or adjacent each rail 19, and there are two wheels 20 carried by each bracket so that each rail is engaged by two supporting wheels.

The retaining wheels 21 are mounted on depending parts of the brackets 23 to engage the lower sides or bottoms of the rails 19 and in the preferred arrangement there is one retaining wheel carried by each bracket 23 and it engages the rail intermediate the points where the rail is engaged by the supporting wheels 20.

It is preferred, in practice, that wipers 24 be mounted on the brackets 23 at the ends thereof or beyond the supporting wheels 20 so that they serve to wipe the ridges of the rails clean in the course of operation of the mounting E lengthwise of the base B.

The drive F for the main carriage is operable to move or shift the main carriage lengthwise of the base B and in accordance with the present invention it is a releasable manually operated drive and it preferably includes a structure by which slack or play is eliminated from the working parts.

In the preferred arrangement illustrated an apron-like housing 25 is mounted on or carried by the forward end 16 of the main carriage D to occur immediately in front of the forward side 17 of the base and to depend from the carriage D so that it overlies the base. The housing 25 is shown as a box-like structure including a vertical back 26 secured to the carriage D, a horizontally disposed bottom 27 projecting forward from the back, a vertically disposed front 28 projecting up from the bottom, a horizontally disposed top 29 and ends 30.

In accordance with the preferred arrangement of parts the principal operating elements of the drive F include, generally, a hand wheel 31 accessible at the front of the housing 25, a rack and pinion mechanism 32 coupling the carriage D and the base B, means 33 supporting the pinion 34 of mechanism 32, so tha it may be shifted into and out of engagement with the rack 35 of mechanism 32, and a drive from the hand wheel 31 to the pinion 34 including a speed change mechanism 36 and a chain drive 38.

The rack 35 of mechanism 32 is fixed to the base B at the forward side thereof and extends lengthwise of the base. The teeth of the rack are at the upper side thereof so that the pinion to engage the rack is located above the rack. The pinion 34 of the mechanism 32 is carried on a rotatable pinion shaft 37 supported by the means 33 so that it is shiftable relative to the rack in order to move the pinion 34 into and out of engagement with the rack.

The means 33 supporting the pinion shaft involves primarily a shaft arm having one end pivotally connected to or with the carriage D while the other end which carries the pinion shaft 37 is free to move vertically and thus move the pinion 34 relative to the rack.

In accordance with the broader principles of the invention various driving connections may be provided between the hand whel 31 and the pin 34 of the mechanism 32. However, I have found it most advantageous that this drive should include a speed change mechanism, preferably a speed reducing mechanism, and I have, in practice, employed a standard gear box 40 carrying a speed reducing mechanism and having a shaft 41 projecting from it to carry the hand wheel 31 and a shaft 42 projecting from it to carry a drive sprocket 43 of the chain drive 38. In the drawings I have shown the gear box 40 located within the housing 25 where it is made secure or fixed by suitable mounting means 44. The shaft 41 projects forward from the gear box 40 and an extension of the shaft extends through the prong 28 of the housing 25 to carry the hand wheel 31 at the front of the housing where it is conveniently accessible. The shaft 42 projects from the other or back side of the gear box 40 where it has the drive sprocket 43 fixed on it and where it serves as a pivotal support for the arm of means 33.

The chain drive 38, as shown in the drawings, involves the drive sprocket 43 on shaft 42, a driven sprocket 46 on the pinion shaft 37, and a chain 48 running between and coupling the sprockets.

In accordance with the preferred form of the invention the arm forming the means 33 is an adjustable or extensible arm having an inner section 50 with a yoke portion 51 pivoted on the shaft 42 and embracing the drive sprocket 43 and having an outer section 52 with a yoke 53 at its outer end pivotally carrying shaft 37 and embracing the driven sprocket 46. The middle or central portions of the arm sections 50 and 52 overlap and are joined by fasteners such as bolts 55. The bolts extend through holes and slots in the overlapping arm portions in such manner as to allow for limited relative movement of the arm sections longitudinally of each other to take slack out of the chain 48.

The means 33 further includes an operating part or handle 56 projecting from the arm structure just described forward through a slot 57 in the front 28 of housing 25 to project forward from the housing where it is accessible for operation.

With the mechanism of means F as above described the arm of means 33 is normally in the down position where the pinion 34 is in operating engagement with the rack 35. To move or advance the main carriage D lengthwise of the base B the operator located at the front or forward end of the table A can conveniently engage the hand wheel 31 and rotate it in either direction. It will be understood, of course, that the direction of rotation of the wheel 31 will determine the direction in which the carriage B is moved along base B and that the relationship of parts included in the means F will determine the mechanical advantage that the operator has over the carriage D. Whenever the operator wishes to move the carriage D freely or rapidly along the base B he may do so by merely lifting up on the handle 56 causing the pinion 34 to be disengaged from the rack 35. It will be apparent that when the pinion 34 is disengaged from the rack 35 the means F is released or disengaged, allowing free operation of the carriage along the base through the rollers or wheels of the means E.

The upper or second carriage G is an elongate horizontally disposed element located above the main carriage D and supported thereon through the mounting H.

The mounting H supports the upper carriage G on or from the main carriage D for movement lengthwise of the main carriage and for pivotal movement about a vertical axis. The mounting H in the form illustrated in the drawings involves, generally, rails 60 extending longitudinally of the carriage D, a platform 61 arranged above the main carriage, supporting wheels 62 carried by the platform 61 and running on the rails 60, retaining wheels 63 carried by the platform and engaged with the rails 60, a bearing plate 64 on the bottom of the carriage G bearing upon the platform 61, and a pivot pin 65 pivotally connecting or coupling the bearing plate 64 and the platform 61.

The rails 60 are horizontally disposed and extend longitudinally of carriage D. In the case illustrated the rails 60 are in the nature of horizontally disposed flanges on opposite sides of the carriage D at the upper portion thereof, and each rail has a rib on its upper side with angularly related or inclined sides 66. The supporting wheels 62 are carried by brackets 67 and have grooved peripheries engaging the ribs of the rails. There are two supporting wheels carried by each bracket 67 so that each rail is engaged by two supporting wheels. A single retaining wheel 63 is carried by each bracket 67 and engages the under side of a rail 60 between the points where the rail is engaged by the supporting wheels. It is preferred that wipers 68 be carried by the brackets 67 to engage and wipe the ribs of the rails keeping them clean where they are engaged by the wheels.

The platform 61 of means H supported on carriage D for movement therealong through the wheels, as above described, has a flat horizontally disposed top 70 on which the bearing plate 64 rests.

The pivot pin 65 is vertically disposed and extends through and between the platform and the bearing plate pivotally connecting these parts so that the bearing plate may turn relative to the platform about the axis of the pin. In practice the frictional engagement established between the platform and bearing plate is such as to normally resist movement of the bearing plate relative to the platform, unless the parts are deliberately operated.

The drive J for operating the mounting H longitudinally of carriage D is a manually operated releasable drive. In the form illustrated the drive J includes, generally, a drive member 71 operable longitudinally of the carriage D, a hand wheel 72, a drive 73 between the hand wheel and the member 71, and a releasable coupling 74 connecting the platform and the drive member 71.

The drive member 71 is preferably a chain operable over a drive sprocket 76 and an idler sprocket 77 so that it has a portion which is exposed and which extends lengthwise of the carriage D.

The drive 73 preferably involves a change speed mechanism incorporated in a gear box 80, or the like, mounted in housing 81 on the front or forward end of carriage D. The change speed mechanism preferably involves a forwardly projecting shaft 82 which projects from the front of the housing 81 to carry the hand wheel 72 at the front of the housing where it is conveniently accessible to the operator of the apparatus. A shaft 83 projects from one side of the gear box 80 and carries the drive sprocket 76. The idler sprocket 77 is supported by a suitable bracket 84 at the rear end portion of carriage D. Bracket 84 is supported through fasteners 85 so that it can be adjusted somewhat lengthwise of carriage D in order to properly tension the chain that runs between the sprockets.

The releasable coupling 74 is shown as a clamp type of mechanism including a clamp jaw 86 carried on a pivoted arm 87 so that it is movable vertically in opposition to a fixed jaw 86ª. The jaws are mounted on a suitable bracket 88 on the platform and have overlying lower end portions depending from the platform to the parts 89 and 89ª accessible to the operator. A spring 88ª is arranged between the parts 89 and 89ª and normally yieldingly urges the part 89ª downwardly so the jaw 86 is normally in pressure engagement with the chain. The mechanism can be released from the chain at any time by lifting part 89ª. A pad 86ª of gripping material may be provided on jaw 86 to assure firm engagement with the chain.

With the mechanism just described the mounting H can be moved in either direction lengthwise of carriage D by simply rotating the hand wheel 72 and the relationship of parts in the mechanism is such as to give the hand wheel the desired mechanical advantage over the mounting H. Whenever it is desired to move the mounting H freely and independent of the other parts, it is merely necessary to lift the handle part 89ª which operation disengages the jaw 86 from the chain.

The torch mounting K includes, generally, the carrier 10 and a torch head supported by or from the carrier. In the particular case illustrated the torch head is supported from the carrier 10 through an arm 100.

The carrier 10 is supported on the upper carriage D through mounting L for movement longitudinally of carriage G.

The mounting L includes, generally, rails 101 extending longitudinally of carriage G, supporting wheels 102 on the carrier engaging the rails 101 and retaining rollers or wheels 103 on the carrier 102 engaging the rails 101. The rails 101 extend longitudinally of carriage G and may be in the nature of outwardly projecting flanges at the sides of carriage G. The rails are provided at their upper sides with ribs with inclined sides 104 and the supporting rollers 102 carried by brackets 105 on the carrier have grooved peripheries receiving the ribs of the rails. There is a bracket 105 at each side of the carrier and each bracket carries two supporting wheels 102 so that each rail is engaged by two supporting wheels. Each bracket 105 carries one retaining wheel 103 which engages the under side of each rail between the points where it is engaged by supporting wheels. Wipers 106 are carried by the brackets 105 to engage the rails to clean them ahead of the wheels.

The drive M for the carrier 10 operates to move the carrier lengthwise of carriage G. The drive M is a manually operated releasable drive and, as shown in the drawings, it includes a drive member 110 operable lengthwise of carriage G, a hand wheel 111, a drive 112 between the hand wheel and the drive member 110 and a releasable coupling 113 between carrier 10 and the member 110.

The drive member 110 extends longitudinally of carriage G and is preferably a chain extending between a drive sprocket 115 and an idler sprocket 116. The drive 112 is preferably a change speed mechanism involving a gear box 117 mounted in a housing 118 at the forward end of carriage G. The mechanism 112 has a shaft 120 projecting from the forward side of housing 118 and carrying the hand wheel 111 where it is accessible at the front of the housing. The drive sprocket 115 is carried on a shaft 121 projecting from the side of the gear case 117. The idler sprocket 116 is carried by a bracket 123 at the rear end portion of carriage G. The bracket is adjustable lengthwise of the carriage G to take slack out of the chain so that the chain has a tight horizontally disposed part forming the member 110.

The releasable coupling 113 may be the same as the releasable coupling 74 above described, that is, it may involve a clamp jaw 130 normally engaged with the chain and an operating part 131 for the jaw accessible to the operator and adapted to be lifted against the action of the spring 132 when it is desired to release the coupling.

With the construction just described the carrier 110 can be moved longitudinally of the carriage G by rotation of the hand wheel 111 and when it is desired to shift the carrier 10 freely along the carriage G the operator lifts the operating part 131 freeing the jaw 130 from the chain.

The arm 100 projects from the carrier 10 so that the torch mounting carries the torch T beyond the rear or inner end of carriage G and preferably to one side thereof. The arm 100 is shown extending rearwardly and laterally from the carrier 10 and it is provided at its outer or rear end with a vertically disposed face plate 134. The face plate 134 is vertically disposed and has a flat face supporting a mounting plate 135 which pivotally supports or carries a pivot pin 136 carrying a torch holder 137. Operating means 138 connects or couples the plates 134 and 135 to normally hold them against movement relative to each other and is operable to turn the mounting plate relative to the face plate. A horizontally disposed pivot pin 140 pivotally connects the plates 134 and 135.

The operating means 138 involves arms 141 projecting radially from the plates 134 and 135, a screw 142 and blocks 143 pivotally mounted on the arms 141 and carrying the screw 142. The threads on one end of screw 142 engaged with one block are lefthanded, while the threads on the other end of the screw engaging the other block are righthanded. With this construction when the screw is rotated the arms 141 are moved in opposite directions either toward each other or apart, with consequent shifting of the plate 135 relative to the plate 134.

A split sleeve 150 is provided on the mounting plate 135 and rotatably carries the pin 136. A clamp screw 151 is operable to tighten the sleeve onto the pin to set it against rotation, if desired. Through the rotatable mounting of the plate 135 the pin may be disposed at various angles. However, it is preferred ordinarily that it be arranged in substantially a horizontal direction, as shown in the drawings.

The holder 137 for the torch T is a tubular part slidably receiving the body 155 of the torch, and it carries an operating wheel 156 which engages a rack 157 on the body of the torch so that the torch can be adjusted vertically relative to the holder.

The torch may, in practice, vary widely in form and construction and may even be a structure or mechanism other than a cutting torch, as circumstances may require. In the drawings I have shown a typical or conventional torch T involving the body 155 and having a tip 160 adjacent the work W and having supply lines 170 coupled to the upper end of the body.

In accordance with the preferred form of the invention a stop means is provided in connection with the holder 137 so that the pin 136 can be freely rotatable in the sleeve 150 allowing the holder to be readily rocked through a given angle to shift the torch between two given angles relative to the work W. This is desirable since in many cases it is desired to have the torch pitched somewhat relative to the work as it is advanced, and to be able to readily change the angle or pitch of the torch relative to the work as the torch may be shifted from one edge of the work to another.

The stop means shown in the drawings involves, generally, a stop lug 171 projecting radially from the holder 137 adjacent a flange 172 which carries adjustable stops 173. The stops 173 are shown as screws carried by brackets 174 adjustable on the flange 172. The brackets 174 have pins 175 operating in arcuate slots 176 in the flange 172 and clamp screws 177 are provided for setting the brackets in the desired positions on the flange. The brackets may be moved bodily on the flange and the stops 173 can be adjusted on the brackets so that the stops may be located in any desired positions relative to the stop lug 173. When it is desired to be able to rock the holder the stops 173 are spaced apart with the leg 171 between them and free to move the desired amount in operating from one stop to the other.

From the foregoing description it will be apparent that I have, by my present invention, provided a mechanism or apparatus which supports a torch T, or the like, relative to work W so that an operator at the front of the apparatus may operate the torch relative to the work to make any desired cut on or in the work. Through the various controls or releasable drives above described the operator can with ease and at will move the torch in any desired direction. Through the construction that I have provided the operating or working parts are supported so that there is a minimum of friction or resistance in the apparatus with the result that the motions of the torch are gained with little effort on the part of the operator.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A machine of the character described including an elongate horizontal base located at the front of the machine and extending parallel with the front of the machine, an elongate horizontal main carriage, means supporting said carriage on the base for movement therealong and to project therefrom toward the rear of the machine, operating means for said carriage including a manually engaged control at the front of the machine forward of the base, an upper elongate horizontal carriage, a pivotal mounting pivotally supporting the upper carriage on the main carriage and movable therealong, one end of the upper carriage extending toward the rear of the machine, operating means for shifting the pivotal mounting lengthwise of the main carriage including a manually engaged control at the front of the machine, a carrier mounted on the upper carriage for movement therealong, operating means for the carrier including a manually engaged control at the other end of the upper carriage, and a holder supported by the carrier.

2. A machine of the character described including, an elongate horizontal base extending parallel with the front of the machine, an elongate horizontal main carriage, means supporting said carriage on the base for movement therealong and with a portion projecting therefrom rearwardly of the machine, a drive for the said carriage including a manually operated mechanism and a manualy operated releasable connection releasable for free movement of said carriage along the base, an upper elongate horizontal carriage pivotally supported on the main carriage for movement along said portion thereof, a drive for the upper carriage including a manually operated mechanism and a manually operated releasable connection releasable for free movement of the upper carriage along the main carriage, a carrier supporting a holder and supported on the upper carriage for movement therealong, and a drive for the carrier including a manually operated mechanism and a manually operated releasable connection releasable for free movement of the carrier along the upper carriage.

3. A machine of the character described including, an elongate horizontal base extending parallel with the front of the machine, an elongate horizontal main carriage, means supporting said carriage on the base for movement therealong and to extend transversely thereof, a drive for the said carriage including a manually operated mechanism and a manually operated releasable connection releasable for free movement of said carriage along the base, an upper elongate horizontal carriage pivotally supported on the main carriage for movement therealong, a drive for the upper carriage including a manually operated mechanism and a manually operated releasable connection releasable for free movement of the upper carriage along the main carriage, a carrier supporting a holder and supported on the upper carriage for movement therealong, and a drive for the carrier including a manually operated mechanism and a manually operated releasable connection releasable for free movement of the carrier along the upper carriage, each of said mechanisms including a rotatable hand wheel and each of said releasable connections including a pivoted handle shifted vertically when operated.

4. A machine of the character described including, an elongate horizontal base extending parallel with the front of the machine, an elongate horizontal main carriage, means supporting said carriage on the base for movement therealong and to extend transversely thereof, a drive for the said carriage including a manually operated mechanism and a manually operated releasable connection releasable for free movement of said carriage along the base, an upper elongate horizontal carriage, a mounting pivotally carrying the upper carriage and supported on the main carriage for movement therealong, a drive for the upper carriage including a manually operated mechanism and a manually operated releasable connection releasable for free movement of the upper carriage along the main carriage, a carrier supporting a holder and supported on the upper carriage for movement therealong, and a drive for the carrier including a manually operated mechanism and a manually operated releasable connection releasable for free movement of the carrier along the upper carriage, the releasable connection for the upper carriage and the releasable connection for the carrier each including a releasable clamp.

5. A machine of the character described including, an elongate horizontal base at the front of the machine, an elongate horizontal main carriage supported by the base extending transversely thereof and rearwardly therefrom and operable therealong, an elongate horizontal upper carriage, a mounting pivotally supporting the upper carriage on the main carriage for movement therealong, said mounting being shiftable lengthwise of said main carriage, and a torch mounting including, a carrier operable along the upper carriage and having a horizontally projecting arm extending laterally of and beyond the end of the upper carriage, a torch holder, and pivotal connecting means between the holder and arm.

6. A machine of the character described including, an elongate horizontal base at the front of the machine, an elongate main carriage supported by the base extending transversely thereof and rearwardly therefrom and being operable therealong, an elongate upper carriage, a mounting pivotally carrying the upper carriage and supported on the main carriage for movement therealong, and a torch mounting including, a carrier operable along the upper carriage, a vertically disposed face plate supported from the carrier laterally of the upper carriage, a mounting plate pivotally connected to the face plate, a torch holder, a pivotal connection between the holder and mounting plate, and a stop means limiting pivotal movement between the holder and mounting plate.

7. A machine of the character described including, an elongate horizontal base at the front of the machine, an elongate rigid horizontal main carriage supported by the base extending transversely thereof and operable therealong, an elongate rigid horizontal upper carriage supported on the main carriage for movement about a vertical axis shiftable along the main carriage, and a torch mounting including, a carrier operable along the upper carriage, a verticaly disposed face plate supported from the carrier laterally of the upper carriage, a mounting plate pivotally connected to the face plate, a torch holder, and a horizontal pivotal connection between the holder and mounting plate.

ERNIE L. LAUNDER.

REFERENCES CITED

The following references are of record in the file of this patent:

UNITED STATES PATENTS

| Number | Name | Date |
|---|---|---|
| 47,657 | Otis | May 9, 1865 |
| 233,349 | Howe, Jr. | Oct. 19, 1880 |
| 400,054 | Chapman | Mar. 26, 1889 |
| 561,169 | Murray et al. | June 2, 1896 |
| 1,218,372 | Carstarphen | Mar. 6, 1917 |
| 1,233,452 | Davis | July 17, 1917 |
| 1,249,455 | Myers | Dec. 11, 1917 |
| 1,390,600 | Bucknam | Sept. 13, 1921 |
| 1,479,989 | Harris | Jan. 8, 1924 |
| 1,553,769 | Godfrey | Sept. 15, 1925 |
| 1,674,843 | Spencer | June 26, 1928 |
| 1,825,606 | Schmidt | Sept. 29, 1931 |
| 1,941,184 | Oldham | Dec. 26, 1933 |
| 1,974,513 | Scheidhauer | Sept. 25, 1934 |
| 2,107,396 | Schoitz | Feb. 8, 1938 |
| 2,259,956 | Jones | Oct. 21, 1941 |
| 2,417,511 | Mott et al. | Mar. 18, 1947 |
| 2,481,421 | Hayes | Sept. 6, 1949 |

FOREIGN PATENTS

| Number | Country | Date |
|---|---|---|
| 15,571 of 1912 | Great Britain | July 3, 1913 |